April 14, 1970     D. G. SMITTLE ET AL     3,506,303
TRAY ASSEMBLY FOR AN AIRCRAFT SEAT
Filed Feb. 29, 1968     3 Sheets-Sheet 2
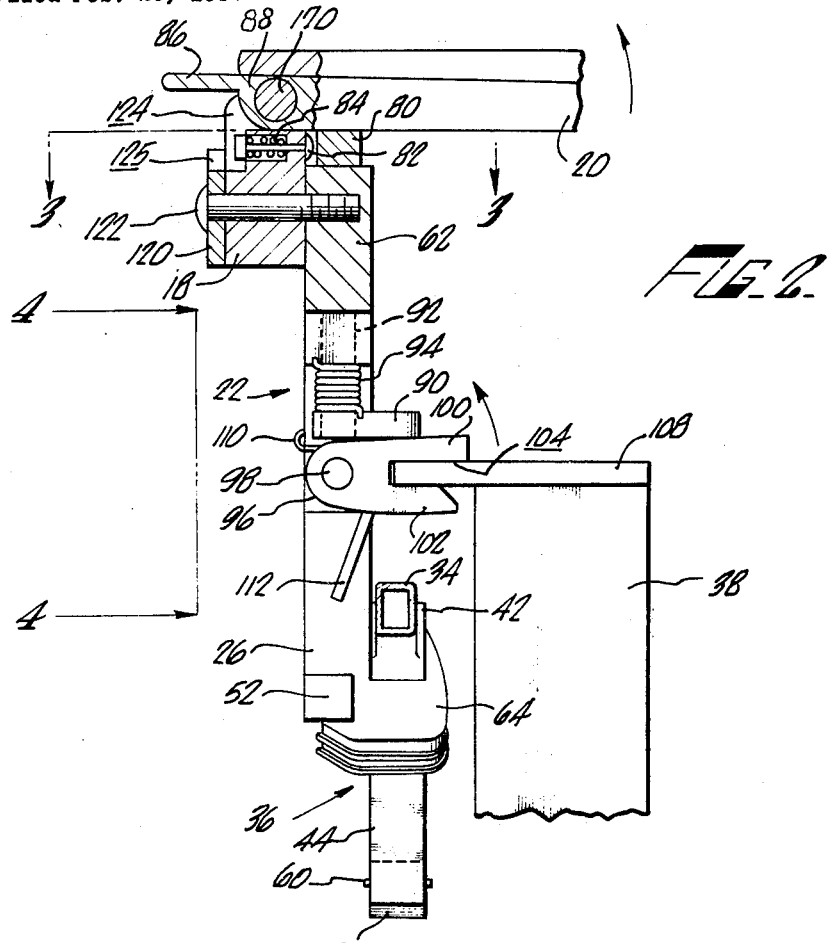
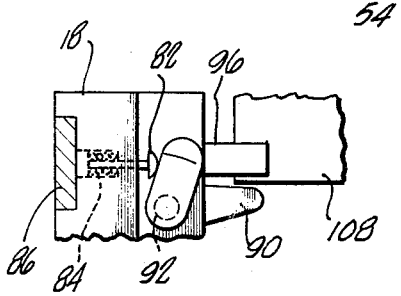
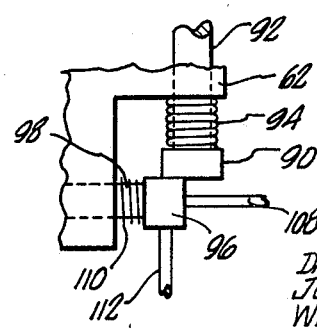
INVENTORS.
DARRELL G. SMITTLE
JOHN R. GOODWIN
WILLIAM R. WIGGINS
BY Christie, Parker & Hale
ATTORNEYS.

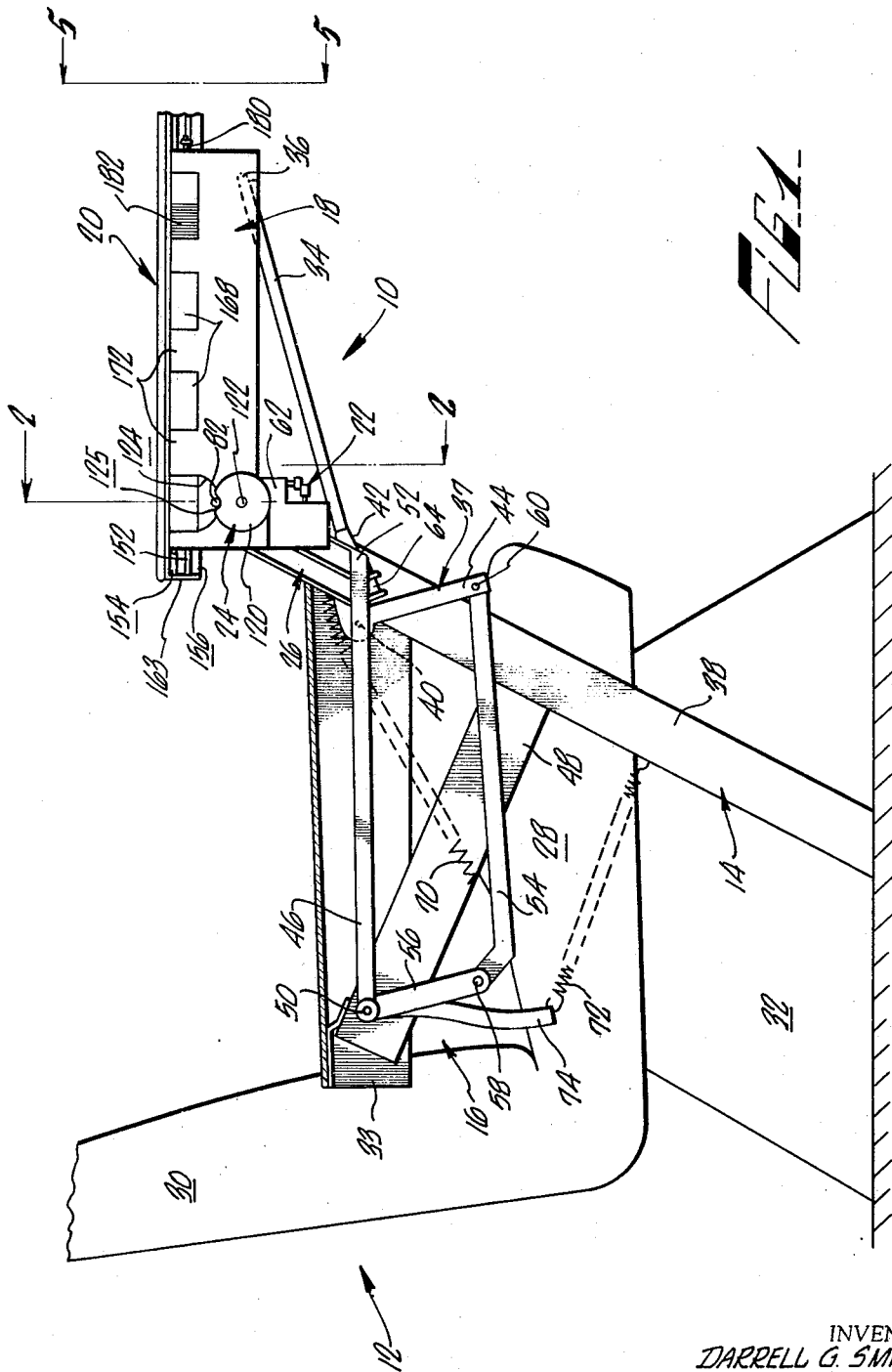

INVENTORS.
DARRELL G. SMITTLE
JOHN R. GOODWIN
WILLIAM R. WIGGINS

BY Christie, Parker + Hale
ATTORNEYS.

United States Patent Office 3,506,303
Patented Apr. 14, 1970

3,506,303
TRAY ASSEMBLY FOR AN AIRCRAFT SEAT
Darrell G. Smittle, Malibu, John R. Goodwin, Woodland Hills, and William R. Wiggins, Gardena, Calif., assignors to Hardman Aerospace, Los Angeles, Calif., a corporation of California
Filed Feb. 29, 1968, Ser. No. 709,250
Int. Cl. A47c 7/62
U.S. Cl. 297—162
17 Claims

ABSTRACT OF THE DISCLOSURE

A tray is carried by linkage disposed to one side of an aircraft seat. The linkage is capable of carrying the tray from a stored position beside the seat to an in-use position above the lap of a passenger. The tray is hinged to rotate between a vertical storage position to a horizontal in-use position where it is locked firmly in place. The lock is released when the tray is pivoted to its vertical position. The linkage is counterbalanced such that a very slight upward force exerted by a passenger on the tray raises it to the in-use position. To avoid flexural stresses on the linkage a torque member is provided which transmits the majority of any bending loads applied to the tray to the assembly's support structure. A lock engages the tray to hold it in a vertical position as the tray is lowered.

BACKGROUND OF THE INVENTION

The present invention relates to tray assemblies used with aircraft. More particularly, the present invention relates to aircraft tray assemblies which may be stored laterally of an aircraft seat.

One of the most common forms of aircraft trays is carried in the back of each aircraft seat. These trays fold into the back of the seat when they are not in use. When in use, the trays depend horizontally out of the seat back.

Modern aircraft seating employs seat backs which may be reclined or raised for the comfort of passengers. This positioning facility often causes considerable passenger inconvenience when the tray is being used. The position of the tray is dependent on the position of the seat back and therefore is only fortuitously well placed. In addition, movement of the seat back while food is on its carried tray often causes spillage.

The placement of trays in seat backs also presents a hazardous hard surface to passengers during impact conditions. In addition, because of the relatively small space allotted to the trays in a seat's back, they are notoriously weak and can collapse when a sufficient force is applied to them.

Thus, there is the need for a safe aircraft tray assembly which presents a stable, rigid platform for passengers, independently of the position of neighboring passengers' seats.

SUMMARY OF THE INVENTION

The present invention contemplates an improved tray assembly which is operable to store a tray safely to the side of an aircraft seat and to maintain the tray in elevated, stable in-use position.

The tray is supported in a vertical, lower position by a tray support structure when it is being stored. In this stored position, the tray is below the level of the aircraft seat's armrest and beside the seat. Means are provided, such as linkage, for elevating the tray from its stored position to an elevated in-use position above the horizontal portion of the seat and forward of the seat's back. Means are also provided for positioning and maintaining the tray in the in-use position. The positioning and maintaining means may include a lock to prevent depression of the tray and a hinge block coupled to the tray to hold it horizontal.

Preferably, the tray itself is hinged in its middle to allow it to be folded for storage while presenting a large, continuous horizontal surface for use by a passenger. It is also preferred to mount the tray on a track to provide for horizontal in-use positioning convenience of the seat's occupant.

In the presently preferred embodiment, a lock is provided to hold the tray in its in-use position. The lock is released when the tray is brought into vertical position from its horizontal in-use position. A vertical lock is also provided to maintain the tray in its vertical position as it travels from the in-use position to the stored position.

In order to avoid severe torsional stresses on the trays carrying linkage applied while the tray is in use, it is preferred to use a torque transmitting member coupled to the tray and the tray support structure such that flexure forces are transmitted to the support structure before they act on the linkage. This torque transmitting member is preferably pivoted to the hinge block and has a claw-shaped lower end to engage a leading link of the linkage. The leading link is pivotally connected between a forward portion of the hinge block and the support structure. The torque transmitting member engages the leading link proximate the latter's pivotal connection to the support structure to transmit the flexural load to the lateral surfaces of the leading link and then to the support structure. The close proximity of the engaged portion of the link to its pivot avoids stressing the balance of the linkage.

In addition to the leading link, the linkage preferably includes a trailing link attached to its forward end to the torque transmitting member and pivotally connected at its rear end to the tray support structure. A coordinating link couples the trailing and leading links such that the tray and hinge block traverse a substantially horizontal path between the stored and in-use positions. It is also preferred to employ a counterbalance coupled between the linkage and the support structure to aid in the raising of the tray to its in-use elevated position.

In the presently preferred embodiment, the locking means which maintain the tray in its in-use position include a pawl which engages the tray support structure and which is controlled in this engagement by a pair of pawls coupled together through a shaft. One of the paired pawls is actuable by a pin in the hinge block through rotation of its complementary pawl to release the engaging pawl when the tray is raised to a vertical position from its in-use position. The tray is maintained in this vertical position by a locking member which engages an ear directly coupled to the tray and which is actuated when the tray is depressed slightly from its in-use position.

The tray assembly of the present invention provides the facility for easy storage of its tray laterally of its aircraft seat. Because the tray assembly is independent of other aircraft seats, the problems encountered heretofore with neighboring seat positioning are avoided. In addition, when the tray is in a stored position it does not occupy an exposed position. As such, no impact hazard is presented by the assembly. Moreover, by taking advantage of the space available adjacent passenger seats, the tray assembly is made much more rigid to provide a sound in-use foundation. In addition, because of the counterbalance the tray may be easily raised by merely lifting it with a slight force. In its more detailed and preferred form, means are provided to securely and automatically lock the tray in a vertical position for its lowering into its stored position. This avoids passenger attention to tray storage. Passenger attention to tray storage is also reduced by the lock release which is actuated when the tray is brought into a vertical position. In short, a passenger need only bring the tray to a vertical position to allow it to drop into its stored position. The provision of a torque transmitting member allows the use of light linkage because torsional loads from the tray are not transmitted to the linkage.

These and other features, aspects and advantages of the present invention will become more apparent from the following description, appended claims and drawings.

BRIEF DESCRIPTION OF THE FIGURES

FIGURE 1 is a side elevational view, partly in section, of the improved tray assembly in combination with an aircraft seat;

FIGURE 2 is a partial view of the tray assembly of FIGURE 1 taken along line 2—2 of FIGURE 1;

FIGURE 3 is a fragmentary view taken along line 3—3 of FIGURE 2 showing the tray assembly's lock and release;

FIGURE 4 is a fragmentary view taken along line 4—4 of FIGURE 2 showing the tray assembly's lock;

DESCRIPTION OF THE PREFERRED EMBODIMENTS

Figure 5:
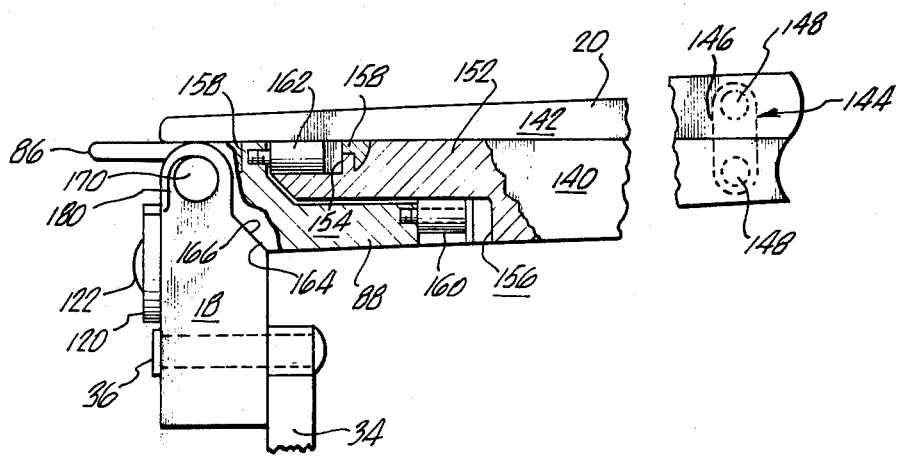
FIGURE 5 is a fragmentary view, partly in section, taken along line 5—5 of FIGURE 1.

FIGURE 1 illustrates the tray assembly and aircraft seat combination of the present invention. The tray assembly is indicated in general by reference numeral 10 while the aircraft seat is indicated by reference numeral 12. Tray assembly 10 includes a tray support structure 14 and linkage 16. Linkage 16 is mounted on tray support structure 14 and carries a hingle block 18. A tray 20 is in turn carried by the hinge block. Tray 20 and hinge block 18 are maintained in a vertical in-use position through a lock 22. The tray may be rotated to a vertical position where it is locked in place by a vertical tray lock 24. Torsional loads from the hinge block and tray assembly are transmitted to tray support structure 14 through a torque transmitting member 26.

Aircraft seat 12 includes a horizontal seating portion 28 and a back 30. The aircraft seat and back are supported by a seat frame 32 on the floor of an aircraft. An armrest 33 is mounted to one side of seating portion 28 and back 30 on tray support structure 14. The armrest covers the linkage and tray support structure as well as hinge block 18 and tray 20 when the latter are in their stored position. Aircraft seat 12 may take any number of prior art forms. Therefore, the aircraft seat will not be further described except as it relates to the combination of the seat and tray assembly.

Linkage 16 includes a leading link 34 which is pivotally connected by a pivot pin 36 to a forward portion of hinge block 18. At its rear end, leading link 34 is pivotally connected through a bell crank 37 to main support spar 38 of support structure 14 at a pivot point 40. Bell crank 37 includes a leading link engaging portion 42 which is rigidly connected to leading link 34. A depending portion 44 of bell crank 37 extends at approximately a right angle to engaging portion 42. A trailing link 46 is pivotally connected to a rearwardly extending auxiliary spar 48 of support structure 14 at pivot point 50. Trailing link 46 is rigidly affixed at its leading end 52 to torque transmitting member 26. A coordinating link 54 couples leading link 34 and trailing link 46 together to maintain hinge block 18 horizontal in its stored and in-use positions. For this purpose, a depending link 56 is pivotally secured to pivot 50 at its upper end and by a pivot pin 58 to coordinating link 54 at its lower end. The forward end of coordinating link 54 is pivotally connected to depending portion 44 of bell crank 37 by a pivot pin 60.

Load transmitting member 26 depends angularly downward from its rigid connection to a hinge block support-ing member 62. As is seen to best effect in FIGURE 2, torque transmitting member 26 is in the same plane as hinge block support member 62. A generally claw-shaped end 64 of torque transmitting member 26 has a U-shaped recess for engaging the lateral walls of link engaging portion 42 of bell crank 37. A torsional load applied downwardly on tray 20 is transmitted through hinge block 18 and hinge block support member 62 to torque transmitting member 26. This load is then applied to the lateral surfaces of engaging portion 42 engaged by claw 64. The load is then transferred to the primary spar 38 through pivot 40.

An over-center spring 70 is connected at its lower end to coordinating link 54 and its upper end to main spar 38. The over-center spring has two stable positions. The first stable position is illustrated in FIGURE 1 wherein the spring acts in tension on coordinating link 54 to bias hinge block 18 and tray 20 into the in-use position illustrated in this figure. The second stable position of over-center spring 70 is reached at a point between the tray's in-use and stored positions. In this second stable position, spring 70 applies a tension load on coordinating linke 54 which tends to maintain it and hence all of linkage 16 and its carried structure in the lowered stored position illustrated schematically in FIGURE 6.

A second spring 72 is connected at one of its ends to spar 38 and at its other end to an arm 74. Arm 74 is attached to depending link 56 to follow the latter's rotational movement about pivot 50. Spring 72 acts through arm 74 to urge linkage 16 and its carried structure into the in-use position illustrated in FIGURE 1.

FIGURES 2 through 4 illustrate the preferred tray assembly lock and release of the present invention. An upper pawl 80 is disposed above hinge block support member 62 in position to be engaged by a release pin 82. Release pin 82 is disposed in hinge block 18 for movement into and away from pawl 80. A biasing spring 84 urges pin 82 out of contact with pawl 80. An ear 86 on a 90° hinge 88 is operable when tray 20 is raised to depress pin 82 and rotate pawl 80.

A lower pawl 90 is coupled to upper pawl 80 through a shaft 92. A spring 94 biases pawl 90 into the position shown in FIGURE 2, that is an engaging position. When ear 86 depresses pin 82, pawl 80 rotates to rotate lower pawl 90 against the bias force of spring 94, as seen to best effect in FIGURE 3.

An engaging pawl 96 is pivotally connected through a shaft 98 to hinge block support member 62. Engaging pawl 96 includes a load support portion 100 and a follower portion 102. These two portions are spaced apart to define an engaging slot 104. In its lock position, engaging pawl 96 engages horizontally extending member 108 at the upper end of spar 38. A spring 110 acts through hinge support member 62 on engaging pawl 96 to bias the pawl counterclockwise into a vertical position with slot 104 open towards the top of FIGURE 2. This bias effect is indicated by the arrow in FIGURE 2. A tripping member, in the form of a wire 112, depends downwardly from pawl 96. When pawl 96 is raised with linkage 16, tripping member 112 strikes leading link 34 to rotate the pawl towards its engaging position. Follower 102 then strikes the lower leading edge of member 108 to fully rotate powl 96 into the position shown. Pawl 96 is maintained in its locking position by lower pawl 90 acting on its upper surface. This is illustrated to best effect in FIGURE 4.

As was previously mentioned, ear 86 is operable to actuate pin 82 and unlock the tray assembly to allow it to swing into its lower stored position. Ear 86 is also used to maintain tray 20 vertical during the course of its travel between its in-use and stored positions. For this purpose a washer 120 is rigidly connected by a pin 122 to hinge block support member 26. Hinge block 18 is supported by pin 122 but is free to rotate with respect to it. A recess 124 is provided in hinge block 18 to accept ear 86 when tray 20 is vertical. An arcuate slot 125 in the peripheral edge of washer 120 allows ear 86 to pass into recess 124 when the tray is in the in-use position. After the tray is raised to a vertical position and as the tray is being lowered to its lower position, washer 120 rotates with respect to hinge block 18. Therefore slot 125 also rotates with respect to the hinge block away from recess 124. With this rotation, ear 86 and hence tray 20 are locked in a vertical position by washer 120.

Tray 20 and its supporting hinge block 18 will be described with particular reference to FIGURES 1 and 5. Tray 20 includes a first section 140 and a second section 142. These two sections are coupled together by a 180° hinge 144. 180° hinge 144 includes a plurality of hinge links 146 which are coupled to sections 140 and 142 through dowel pins 148. The end of section 140 has a concave curvature while the end of section 142 has a convex curvature. When upper section 142 is rotated, its convex end will mate with the concave end of section 140 to provide a stop.

The inner end of lower section 140 of tray 20 includes a track portion 152. This portion is narrower than the adjoining structure of lower section 140 to provide a continuous surface for the entire lower section. Track portion 152 includes an upper roller recess 154 and a lower roller recess 156. A coupling link 158 locks section 140 to 90° hinge 88. This link allows fore and aft tracking of tray 20 with respect to hinge 88. Link 158 bridges roller recess 154 between rollers to provide its coupling function while presenting a smooth upper surface for tray section 140. A lower set of rollers 160 are mounted to 90° hinge 88 for rolling contact with the horizontal surface of lower roller recess 156. A complementary upper set or rollers 162 are also mounted to 90° hinge 88 to bear against the horizontal surface of roller recess 154. Mounting of individual rollers may be effected through smooth shank fasteners. These rollers allow tray 20 to move fore and aft with respect to the seat employed with the tray assembly for the convenience of the passenger. Downwardly extending flanges 163 at either end of track portion 152 provide stops for tray travel when they encounter the ends of hinge block 18.

90° hinge 88 has an angulated abutting surface 164 which cooperates with a mating angulated abutting surface 166 of hinge block 18 to maintain tray 20 in a horizontal position. With reference to FIGURE 1, 90° hinge 88 includes a plurality of bosses 168 which are interfitted in recesses in hinge block 88 and tightly receive a horizontally disposed coupling shaft 170. Hinge block 18 has a plurality of journals 172 tandemly aligned with the bosses which also receive shaft 170. Through bosses 168, journals 172 and shaft 170, 90° hinge 88 is connected to hinge block 18. A snubber spring 180 is connected to hinge block 18 and shaft 170 to cushion the impact of abutting surfaces 164 and 166 when hinge 88 is rotated from the vertical to the horizontal. A biasing spring 182 is disposed about shaft 170 and is attached to the shaft and hinge block 18 to urge hinge 88 and its carried tray 20 into the tray's horizontal in-use position.

The operation of the improved armrest assembly will now be described.

Figure 6:
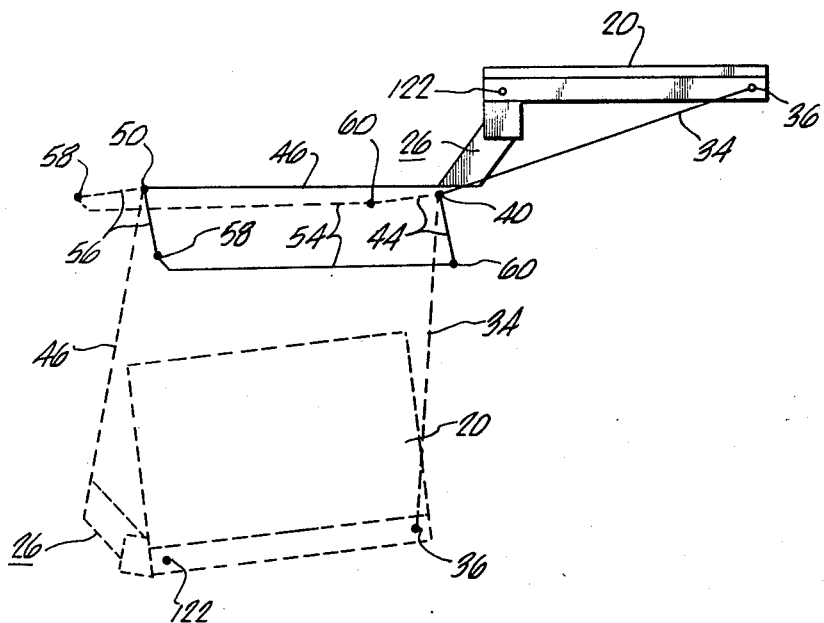
FIGURE 6 is a schematic showing the course of a tray between its stored and in-use positions.

Initially, tray 20 is in its stored lower position as illustrated in FIGURE 6. In this lower stored position tray 20 is vertical and folded on itself about hinge 144.

The tray is brought into its in-use position by the application of a slight forward force by a passenger. At a predetermined point during the tray's elevation, over-center spring 70 moves into its alternate stable position to augment the lifting force applied by the passenger. During movement from the stored position to the raised in-use position, trailing link 46 rotates about pivot point 50 while leading link 34 rotates about pivot point 40. This is illustrated in FIGURE 6. The depending portion 44 of bell crank 37 and depending link 56 will rotate together in a counterclockwise sense. Coordinating link 54 insures this coordinated movement of depending portion 44 and depending link 56 and therefore couples the movement of trailing link 46 and leading link 34.

As seen to best effect in FIGURE 2, just before tray 20 reaches its elevated in-use position, wire tripping member 112, depending from engaging pawl 96, will strike the lower edge of leading link 34 to partially rotate the engaging pawl clockwise from its unengaged position. Follower portion 102 then encounters the lower leading edge of member 108 of support spar 38 to bring engaging pawl 96 horizontal with recess 104 in full engagement with member 108. When tray 20 is brought from its vertical stored position to its horizontal in-use position, pin 82 retracts from its engagement with upper pawl 80 because of the force applied by bias spring 84 and the release of ear 86. Spring 94 will then rotate lower pawl 90 into engagement with the upper surface of load supporting portion 100 of pawl 96. This engagement is seen in FIGURE 4. The tray assembly is then locked in its in-use position.

When tray 20 is rotated from its vertical storage position to its horizontal in-use position by virtue of the force of biasing spring 182, abutting surface 164 of hinge 88 will bear on abutting surface 166 of hinge block 18. Snubber spring 180 cushions the impact on these abutting surfaces. Tray section 142 may then be pivoted around hinge 144 to present a substantially continuous horizontal surface made up of the upper exposed portions of sections 140 and 142. The tray may be horizontal tracked at the convenience of a passenger because of the rolling engagement of track section 152 to hinge 88.

When it is desired to store tray 20, it is folded upon itself about hinge 144 to the FIGURE 5 position. The folded tray is then rotated about the axis of shaft 170 until ear 86 depresses pin 82. Depressed pin 82 rotates pawl 80 and its dependent pawl 90 to free engaging pawl 96. Spring 110 and the weight of the tray assembly cause engaging pawl 96 to rotate counterclockwise, as shown by the arrow in FIGURE 2, to its stored position. When pawl 96 is disengaged from member 108, the tray assembly begins to lower into its stored position.

As tray assembly 10 is being lowered to its stored position, washer 120 will rotate with respect to recess 124 to engage the now vertical ear 86 and lock tray 20 in its vertical stored position. Towards the lower portion of its travel towards the stored position, over-center spring 70 will switch to its alternate stable position and apply force on link 54 tending to further lower the tray.

What is claimed is:
1. In combination with an aircraft seat having an armrest, an improved tray assembly comprising:
   (a) a tray support structure disposed beside the aircraft seat;
   (b) a tray carried by the support structure for movement between a stored position and an elevated in-use position, the stored position being beside the seat below the seat's armrest and the in-use position being above the horizontal portion of the seat forward of the seat's back;
   (c) means for elevating the tray from its stored position to its in-use position;
   positioning and maintaining means coupled with the tray support structure and the tray for positioning and maintaining the tray in the in-use position, including a hinge block pivotally connected to the linkage means such that the hinge block is substantially horizontal in movement between the stored and the in-use positions, the hinge block being connected to the linkage means such that in the in-use position the hinge block is above the horizontal portion of the seat, forward of the seat's back and to one side of the seat; and
   (d) a hinge coupling the tray to the hinge block, such that the tray may be rotated between a substantially horizontal position and a substantially vertical position.

2. In combination with an aircraft seat having an armrest, an improved tray assembly comprising:
   (a) a tray support structure disposed beside the aircraft seat;
   (b) a tray carried by the support structure for movement between a stored position and an elevated in-use position, the stored position being beside the seat below the seat's armrest and the in-use position being above the horizontal portion of the seat forward of the seat's back;
   (c) linkage means for elevating the tray from its stored position to its in-use position; and
   (d) means coupled with the tray support structure and the tray for positioning and maintaining the tray in the in-use position, including lock means operable to engage the tray support in the in-use position and releasable by the tray when the latter is in its vertical position.

3. The improvement claimed in claim 2 including:
   means to engage the tray to hold it in its vertical position until the tray is in the in-use position.

4. In combination with an aircraft seat having an armrest, an improved tray assembly comprising:
   (a) a tray support structure disposed beside the aircraft seat;
   (b) a tray carried by the support structure for movement between a stored position and an elevated in-use position, the stored position being beside the seat below the seat's armrest and the in-use position being above the horizontal portion of the seat forward of the seat's back;
   (c) linkage means for elevating the tray from its stored position to its in-use position including a torque member operable to transmit a substantial portion of a flexural load applied to the tray in the in-use position to the tray support structure before such load would otherwise be transmitted to the balance of the linkage means; and
   (d) means coupled with the tray support structure and the tray for positioning and maintaining the tray in the in-use position.

5. The improvement claimed in claim 4 wherein the linkage means includes:
   counterbalance means operable at a predetermined point to urge the tray into the in-use position.

6. In combination with an aircraft seat having an armrest, an improved tray assembly comprising:
   (a) a tray support structure disposed beside the aircraft seat;
   (b) a tray carried by the support structure for movement between a stored position and an elevated in-use position, the stored position being beside the seat below the seat's armrest and the in-use position being above the horizontal portion of the seat forward of the seat's back, the tray including a first and second section secured together through a hinge, the hinge being operable in the in-use position to allow the tray to be unfolded into a substantially continuous horizontal surface defined by flat surfaces of the first and second sections;
   (c) linkage means for elevating the tray from its stored position to its in-use position;
   (d) means coupled with the tray support structure and the tray for positioning and maintaining the tray in the in-use position; and
   (e) track means for fore and aft positioning of the tray.

7. An improved aircraft tray assembly comprising:
   (a) a support structure;
   (b) linkage means pivotally attached to the support structure for movement between a lowered tray storage position beside an aircraft seat and an elevated in-use position;
   (c) a hinge block carried by the linkage means such that in the in-use position the hinge block is substantially horizontal; and
   (d) a tray carried by the hinge block through a hinge, the hinge being operable to allow the tray to rotate between a vertical position and a horizontal in-use position; and wherein
   the linkage means includes means for moving the hinge block between the storage position and the in-use position while maintaining the pivot axis of the hinge in a substantially horizontal orientation throughout the motion.

8. The improved aircraft tray assembly claimed in claim 7 including:
   (a) locking means for maintaining the tray in its horizontal in-use position; and
   (b) lock release means operable to disengage the locking means upon rotation of the tray from its horizontal in-use position to the vertical position.

9. The improved aircraft tray assembly claimed in claim 8 including:
   a vertical tray lock operable to lock the tray in its vertical position upon rotation of the tray from its horizontal in-use position to the vertical position and a slight movement from the in-use position towards the storage position.

10. An improved aircraft tray assembly comprising:
    (a) a support structure;
    (b) linkage means pivotally attached to the support structure for movement between a lowered tray storage position beside an aircraft seat and an elevated in-use position;
    (c) a hinge block carried by the linkage means such that in the in-use position the hinge block is substantially horizontal; and
    (d) a tray carried by the hinge block through a hinge, the hinge being operable to allow the tray to rotate between a vertical position and a horizontal in-use position; and wherein the linkage means includes:
    (e) a leading link pivotally connected to the hinge block proximate the hinge block's forward edge and to the support structure at a point slightly below the rear portion of the hinge block when the latter is in the in-use position;
    (f) a torque transmitting member having a first end engageable with the leading link in the in-use position proximate the pivotal connection of the leading link to the support structure, the torque transmitting member being pivotally connected to the hinge block at its second end proximate the hinge block's rear edge; and
    (g) a trailing link rigidly connected at one end to the torque transmitting member and pivotally connected at its other end to the support structure.

11. The improved aircraft tray assembly claimed in claim 10 wherein the torque transmitting member's first end includes a generally U-shaped recess for engaging the lateral sides of the leading link.

12. The improved aircraft tray assembly claimed in claim 11 wherein the linkage means includes:
    (a) a coordinating link coupling the leading and trailing links together such that the hinge block is maintained substantially horizontal; and
    (b) an over-center spring engaged to the support structure and the linkage means having a first and a second stable position, the first stable position urging the hinge block towards the in-use position and the second stable position urging the hinge block towards the storage position, the over-center spring being in the first stable position during the upper portion of the linkage means' path from the storage position to the in-use position and in the second stable position during the lower portion of such path.

13. An improved aircraft tray assembly comprising:
    (a) a support structure;

(b) linkage means pivotally attached to the support structure for movement between a lowered tray storage position beside an aircraft seat and an elevated in-use position;

(c) a hinge block carried by the linkage means such that in the in-use position the hinge block is substantially horizontal;

(d) a tray carried by the hinge block through a hinge, the hinge being operable to allow the tray to rotate between a vertical position and a horizontal in-use position;

(e) locking means for maintaining the tray in its horizontal in-use position; and (f) lock release means operable to disengage the locking means upon rotation of the tray from its horizontal in-use position to the vertical position; including (g) a pin disposed in the hinge block in position to release the tray locking means, and (h) an ear on the hinge operable to engage the pin when the tray is in a vertical position to release the tray locking means.

14. The improved aircraft tray assembly claimed in claim 13 wherein the locking means includes:

(a) a first and a second pawl coupled together through a shaft;

(b) means to bias the first and second pawls into a locking position;

(c) an engaging pawl engageable with the support structure, the second pawl in its locking position being operable to maintain such engagement;

(d) means to bias the engaging pawl into a normally disengaged position; and (e) means associated with the engaging pawl for positioning the latter into its engaging position just prior to the in-use position.

15. The improved aircraft tray assembly claimed in claim 13 including a member to engage the ear when the tray is in a vertical position to lock the tray in the vertical position just below the in-use position, the member being fixed to the linkage means such that it rotates into its ear engaging position upon lowering of the tray from its in-use position.

16. An aircraft tray assembly as claimed in claim 7 wherein the linkage means comprises:

a plurality of pivotally interconnected links;

a first pair of spaced apart pivot means on the support structure for supporting the links; and a second pair of spaced apart pivot means on the hinge block for supporting the hinge block on the links.

17. In an aircraft seat having a tray mounted for motion between a vertical stored position within an armrest, a vertical intermediate position out of the armrest, and a horizontal in-use postion; and hinge means supporting the tray for motion between the vertical intermedate position and the horizontal in-use position; an improved mounting linkage comprising:

means for moving the hinge means and the tray between the stored position and the intermediate position including a plurality of pivotally interconnected links connected to the hinge means at a pair of spaced apart pivot points, the interconnected links being supported at a different pair of spaced apart pivot points.

References Cited

UNITED STATES PATENTS

| | | | |
|---|---|---|---|
| 1,565,362 | 12/1925 | Hemleb | 312—21 |
| 2,767,771 | 10/1956 | Leonard | 297—145 |
| 2,947,348 | 8/1960 | Peckham | 297—145 |
| 3,140,894 | 7/1964 | Hicke | 297—162 |
| 3,351,377 | 11/1967 | Anderson | 297—162 |
| 3,367,713 | 2/1968 | Krueger | 297—162 |

JAMES T. McCALL, Primary Examiner

U.S. Cl. X.R.

297—194